United States Patent [19]

Nielsen

[11] Patent Number: 4,871,897
[45] Date of Patent: Oct. 3, 1989

[54] NOZZLE FOR LASER PROCESSING
[75] Inventor: Steen E. Nielsen, Skaevinge, Denmark
[73] Assignee: Instituttet for Produktudvikling, Lyngby, Fed. Rep. of Germany
[21] Appl. No.: 192,789
[22] PCT Filed: Aug. 21, 1987
[86] PCT No.: PCT/DK87/00103
  § 371 Date: Apr. 26, 1988
  § 102(e) Date: Apr. 26, 1988
[87] PCT Pub. No.: WO88/01553
  PCT Pub. Date: Mar. 10, 1988
[30] Foreign Application Priority Data
  Sep. 1, 1986 [DK] Denmark ............................ 4161/86
[51] Int. Cl.[4] ............................................. B23K 26/16
[52] U.S. Cl. .......................... 219/121.67; 219/121.75; 219/121.78; 219/121.84
[58] Field of Search ........... 219/121.67, 121.7, 121.71, 219/121.72, 121.73, 121.74, 121.75, 121.84, 121.78

[56] References Cited
U.S. PATENT DOCUMENTS
4,461,947 7/1984 Ward ................................ 219/121.84

FOREIGN PATENT DOCUMENTS
1690637 3/1972 Fed. Rep. of Germany.
3008176 2/1986 Fed. Rep. of Germany.
55-70492 5/1980 Japan.
58-103992 6/1983 Japan.

Primary Examiner—C. L. Albritton
Attorney, Agent, or Firm—Cushman, Darby & Cushman

[57] ABSTRACT

A nozzle for laser processing, such as a cutting, the processing allowing a laser beam (A) to be directed towards an article being processed, and whereby the laser beam is supported by a gas flow directed towards the article through the nozzle. According to the invention the nozzle (11) is able to maintain a displacement of the focusing point (D) of the laser beam relative to a center of the pressure (C) for the gas flow through the nozzle, whereby the laser beam (A) is displaced forwards in the processing direction relative to the center of gas pressure (C). As a result the laser beam meets the article first and melts this portion of the article, the portion subsequently being blown away by the gas flow. In this manner the gas flow is efficiently utilized because it does not meet the article until the material to be removed has melted and is thereby removable by blowing.

22 Claims, 5 Drawing Sheets embodiments of nozzle opening

NOZZLE FOR LASER PROCESSING

TECHNICAL FIELD

The present invention relates to a nozzle for laser processing, such as a cutting, said processing allowing a laser beam to be directed towards an article being processed, and whereby the laser beam is supported by a gas flow directed towards the article through the nozzle.

BACKGROUND ART

It is common knowledge to use a laser for cutting metal, as well as it is common knowledge to use a gas beam including for instance oxygen or a gas mixture together with the laser beam towards the processed area.

DESCRIPTION OF THE INVENTION

Under usual conditions a coaxially positioned laser beam is used, i.e. a laser beam situated in the axis (E) through the centre point (C) of the nozzle. In other words the laser beam is situated on the location having the highest gas pressure/gas flow. Furthermore the symmetrical positioning of the laser beam in the nozzle provides a uniform cutting quality irrespective of the cutting direction. A cut groove is obtained by movement of the laser beam/nozzle relative to the material. The purpose of the supporting cutting gas is substantially to remove melt and vapours from the cut groove. The ability of the process to remove the water material depends on the flow conditions in the nozzle and in the cut groove.

According to the invention, the nozzle is able to maintain a displacement of the focusing point of the laser beam relative to a center of gas pressure for the gas flow through the nozzle, whereby the laser beam is displaced forwards in the processing direction relative to the center of gas pressure. As a result the laser beam meets the article first and melts this portion of the article, said portion subsequently being blown away by the gas flow. In this manner the gas flow is efficiently utilized because it does not meet the article until the material to be removed has melted and is thereby removable by blowing.

The nozzle is preferably circular-cylindrical and able to maintain a predetermined eccentric position of the laser beam in the nozzle. According to an alternative embodiment a circular-cylindrical nozzle is also used, but this nozzle is mounted with the laser beam in the center while an eccentrically located outlet nozzle opening is provided for the gas flow. According to a particular embodiment the nozzle may be radially displaceable relative to the laser beam. Within the scope of the invention the nozzle may, however, be of other shapes than the circular-cylindrical shape.

The laser beam is preferably spaced a distance d from the center of gas pressure, whereby 0.01 D is smaller than the distance d in turn being smaller than D/2, D being the diameter of the nozzle. The distance d corresponds preferably to 0.25 times the diameter of the nozzle.

An external control is preferably provided, said control controlling the nozzle and/or the laser beam in response to the desired direction of processing. Such an external control is advantageously connectable to an existing control of a cutting table and/or the laser head. According to a preferred embodiment, the nozzle maintains a predetermined position of the laser beam in the nozzle relative to the direction of processing in such a manner that the center of gas pressure and the laser beam are substantially always situated on the tangent of the direction of processing.

BRIEF DESCRIPTION OF THE DRAWINGS

The invention will be described below with reference to the accompanying drawings, in which.

DESCRIPTION OF THE PREFERRED EMBODIMENTS OF THE INVENTION

Figure 1:
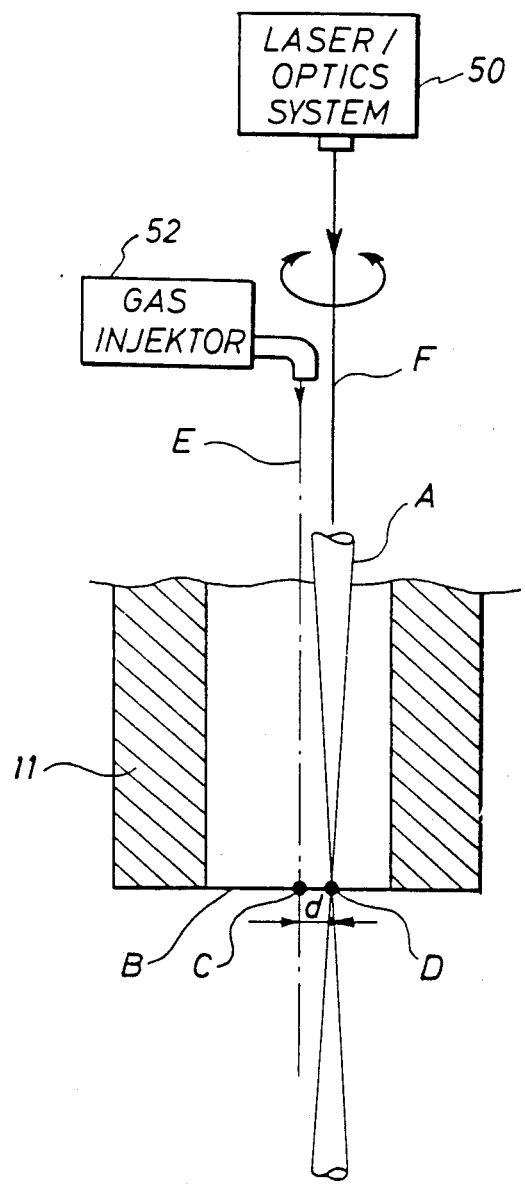
FIG. 1 is a sectional view through the outer portion of a nozzle according to the invention.

FIG. 1 illustrates the principles of the nozzle according to the invention. A laser beam A is focused through a nozzle opening by a known laser and optics system 50. The nozzle opening is preferably circularcylindrical but may have other shapes. A gas, such as oxygen or a gas mixture, is sent together with the laser beam A through the nozzle to remove the material being melted by the laer beam by a known source of compressed gas 52. The center of gas pressure—i.e. the location having the highest dynamic gas pressure causing the highest flow velocity—is then situated in the center of the nozzle at point C on the center axis E. The focal point, i.e. focus D, of the laser beam is displaced relative to the center axis F at the distance d from point C.

Figure 2:
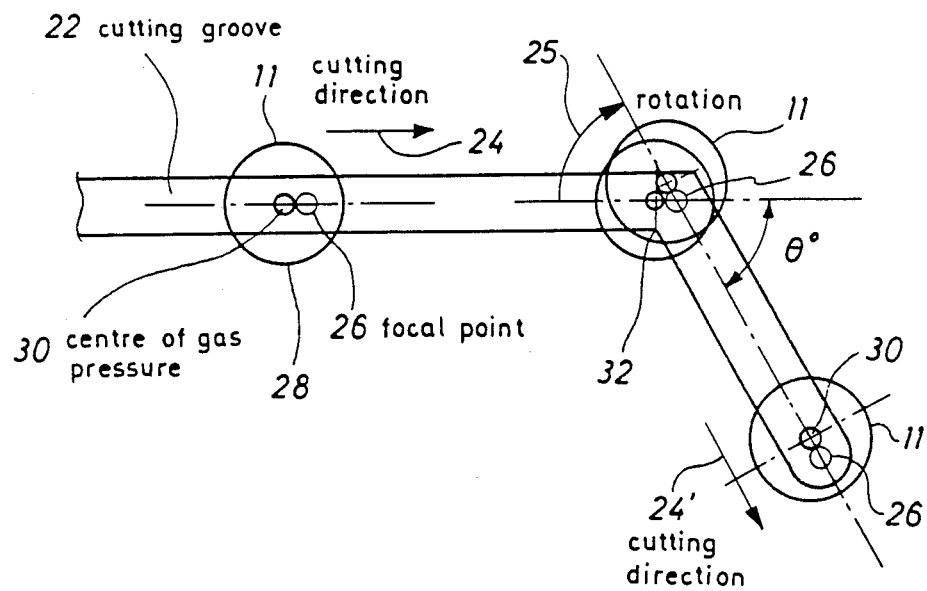
FIG. 2 illustrates the movement of the nozzle of FIG. 1 during the alteration of a cutting direction.

FIG. 2 shows a cut groove 22 in an article. The arrow 24 indicates the cutting direction, and the arrow 25 indicates a new cutting direction. A nozzle 11 has been shown at four different positions. As it appears from the FIGURE the center of gas pressure 30 is centrally located in the nozzle opening whereas the focal point 26 of the laser beam is displaced forwards in the cutting direction. During the first phase of the movement, the nozzle is displaced in the cutting direction with the focal point of the laser beam in front in a rectilinear movement. When the point of discontinuity 32 has been reached, the rectilinear movement is stopped and the nozzle is rotated about the focal point of the laser beam, cf. the arrow 25 and the angle $\theta$. Subsequently the rectilinear movement is continued in the new cutting direction 24'. As illustrated in FIG. 2 the focal point 26 of the laser beam is now situated in front of the center of gas pressure 30 in the new cutting direction.

Figure 3:
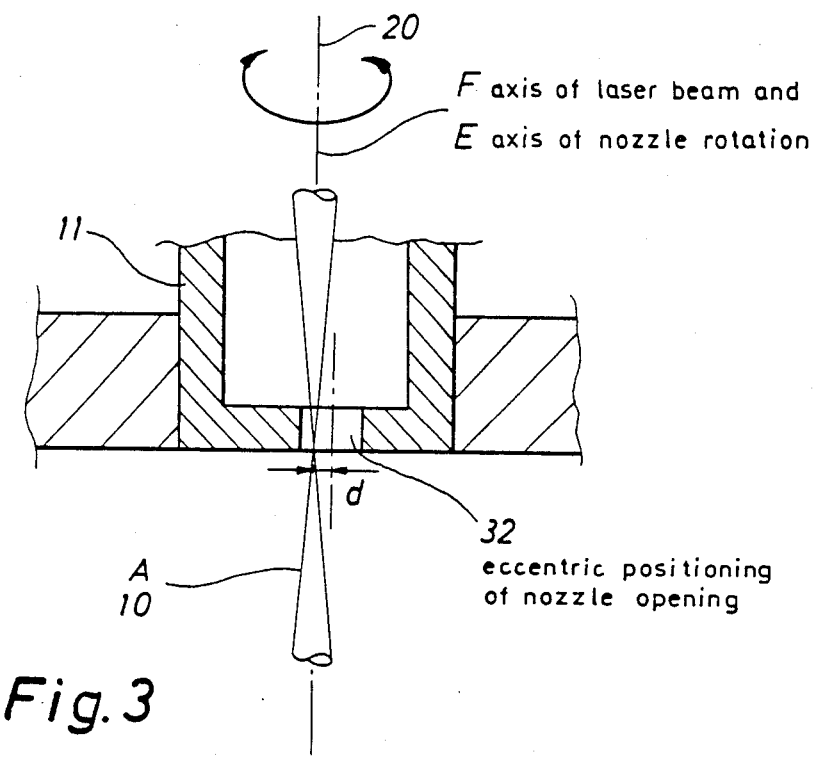
FIG. 3 illustrates a second embodiment of a nozzle according to the invention.

FIG. 3 illustrates an alternative embodiment. According to this embodiment the laser beam 10 is positioned in such a manner that the axis 20 of the laser beam coincides with the axis of the substantially cylindrical nozzle. In turn the nozzle opening 32 is eccentrically situated. The nozzle of FIG. 3 can be used as illustrated in FIG. 2, said FIGURE illustrating the use of the nozzle of FIG. 1 with the exception that the focal point of the laser beam is centered in the nozzle and the nozzle opening. As a consequence the center of gas pressure is displaced backwards relative to the cutting direction.

Figure 4:
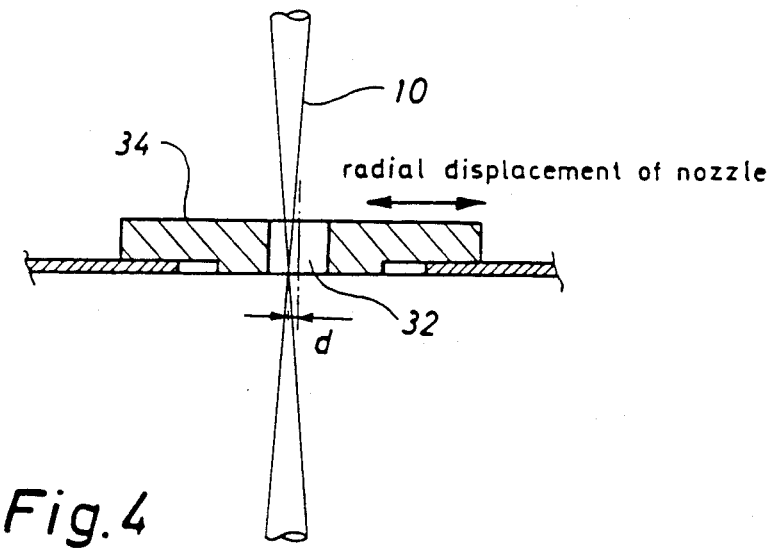
FIG. 4 illustrates a third embodiment of a nozzle according to the invention.

FIG. 4 shows a still further embodiment where the nozzle is a radially displaceable plate 34 comprising a nozzle opening 32. The feeding of gas to such a plate can, of course, be established in many ways and has not been shown.

Figure 5:
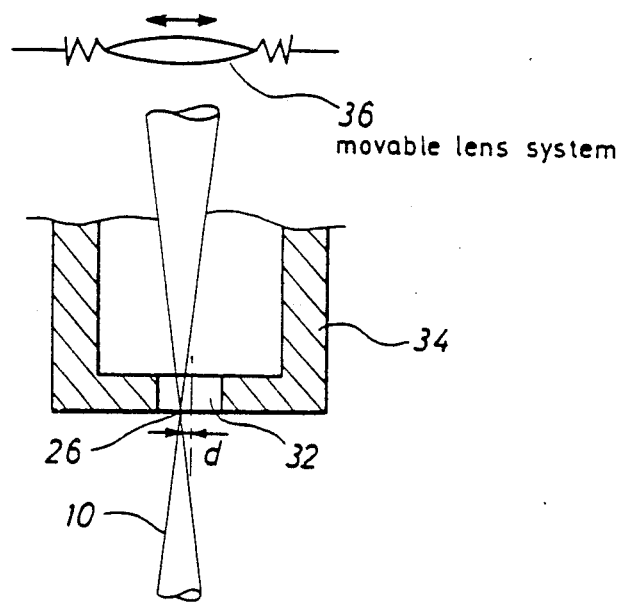
FIG. 5 illustrates a still further embodiment of a nozzle according to the invention.
Figure 6A:
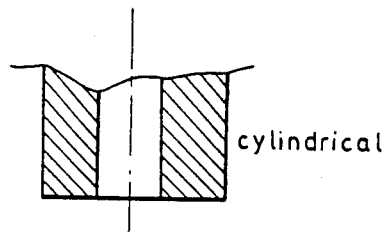
FIGS. 6a-6f illustrate further examples of various nozzle openings.
Figure 6D:
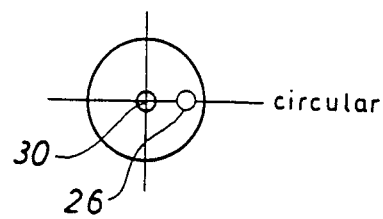
Figure 6B:
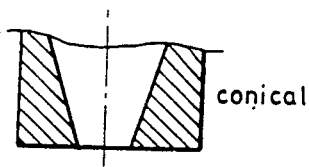
Figure 6E:
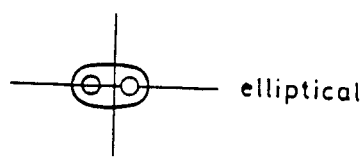
Figure 6C:
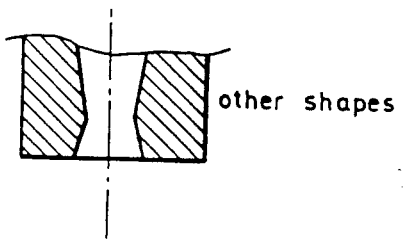
Figure 6F:
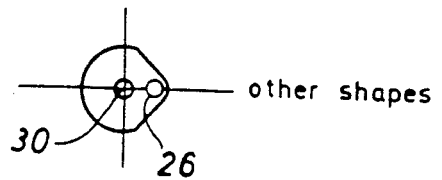

FIG. 5 illustrates an embodiment comprising a fixed nozzle 34 and a centrally located nozzle opening 32 as well as a laser beam 10. The position of the focal point of this laser beam is determined by a movable lens system 36 or another type of movable optical instruments, such as a system of concave mirrors, optical units/plates or the like instruments. The invention may, of course, be varied in many ways, and the various embodiments outlined can be combined. The nozzle and the nozzle opening need not necessarily be circular-cylindrical either but may, as indicated in FIGS. 6a-c, have different shapes. As illustrated by the axial sectional views of FIGS. 6d-f the nozzle, for example may be cylindrical elliptical or otherwise a cylindrical nozzle may be circular-cylindrical of a cross section as outlined in FIG. 6d or ellipticcylindrical of a cross section as outlined in FIG. 6e or of another advantageous shape like the one outlined in FIG. 6f. In order to ensure optimum flow conditions alternative embodiments of the nozzle may, however, also be considered, such as a conical nozzle, cf. FIG. 6b, or a double-frustoconical nozzle, cf. FIG. 6c. A transverse sectional view through these embodiments reveal many possibilities for the embodiment, such as for instance circular, elliptical or other more particular shapes. The essential feature to the invention is that the nozzle is shaped in such a manner that a well-defined center of gas pressure is provided in the cutting plane and a laser beam is allowed to pass through the nozzle with a well-defined focal point also in the cutting plane, and furthermore in such a manner that a well-defined distance exists between the center of gas pressure and the focal point. The nozzle must be mounted in such a manner that the focal point of the laser beam is always in front of the center of gas pressure in the cutting direction. In this manner improved flow conditions are obtained through the nozzle and the cut groove, which implies that the deposition of burrs on the back of the cut is reduced significantly both when oxygen and gas mixtures are employed. The use of particular gas mixtures as supporting cutting gas eliminates the deposition of the so-called "ball burrs" as such burrs are blown out of the cut groove before they harden, and consequently they do not have time to stick to the cutting edge.

The use of particular gas mixtures as supporting cutting gas ensures furthermore slagless cut surfaces when cutting in stainless steel.

I claim:

1. A nozzle for laser processing, such as a cutting, said processing allowing a laser beam to be directed towards an article being processed, and whereby the laser beam is supported by a gas flow directed towards the article through the nozzle, characterized by the nozzle being able to maintain a displacement of the focusing point of the laser beam relative to a center of gas pressure for the gas flow through the nozzle, whereby the laser beam is displaced forwards in the processing direction relative to the center of gas pressure.

2. A nozzle as claimed in claim 1, characterized by the nozzle being circular-cylindrical and able to maintain a predetermined eccentric position of the laser beam in the nozzle.

3. A nozzle as claimed in claim 1, characterized by the nozzle being circular-cylindrical and provided with an eccentrically located outlet opening for the gas flow.

4. A nozzle as claimed in claim 1, characterized by the nozzle being radially displaceable relative to the laser beam.

5. A circular-cylindrical nozzle for laser processing, such as a cutting, said processing allowing a laser beam to be directed towards an article being processed, and whereby the laser beam is supported by a gas flow nozzle, characterized by the nozzle being able to maintain a predetermined eccentric position of the laser beam in the nozzle and being able to maintain a displacement of the focusing point of the laser beam forwardly in the processing direction relative to a center of gas pressure for the gas flow through the nozzle characterized by the laser beam being spaced d from the center, where $0.01 < d < D/2$, D being the diameter of the nozzle.

6. A nozzle as in claim 1, characterized by an external control being provided, said control controlling at least a selected one of the nozzle and the laser beam in response to the desired direction of processing.

7. A nozzle as claimed in claim 6, characterized by the external control being connectable to an existing control of at least a selected one of a cutting table and a laser head.

8. A nozzle as claimed in claim 1, characterised by the nozzle being able to maintain a predetermined position of the laser beam in the nozzle relative to the direction of processing in such a manner that the maximum gas pressure flow and the laser beam are always positioned on the tangent of the direction of processing.

9. A nozzle for laser processing along a predetermined direction, the nozzle directing a laser beam and a gas flow toward an article to be processed, the laser beam having a focusing point and the gas flow having a center of gas pressure, comprising:
at least one wall having an inner surface defining an inner passageway;
means for injecting the gas flow through the inner passageway to cause said center of gas pressure to be at a given point along a given axis; and
means for directing the laser beam through the inner passageway along a predetermined axis displaced from said given axis to cause said focusing point to be displaced in the forward direction of processing relative to said given point.

10. A nozzle according to claim 9 wherein said inner passageway has a central axis and said given point for said gas pressure center is on said central axis.

11. A nozzle according to claim 9 wherein said passageway has a central axis and said predetermined laser beam axis coincides with the central axis.

12. A nozzle according to claim 9, wherein the inner surface defines a circular-cylindrical inner passageway.

13. A nozzle according to claim 12, wherein said wall includes an edge directed inward radially to the inner passageway central axis to define an outlet opening, the outlet opening having a center point located in a predetermined eccentric position relative to the inner passageway central axis, the laser beam being directed along the inner passageway central axis and said given point for said gas pressure center coinciding with the outlet opening center point.

14. A nozzle according to claim 9, wherein the inner passageway has a diameter D, the laser beam being displaced a distance d from the inner passageway central axis according to the relation: $0.01\ D < d < D/2$.

15. A nozzle according to claim 14, wherein d is 0.25 D.

16. A nozzle according to claim 9, wherein the at least one wall is a plate having a nozzle opening defining the inner passageway, the plate being displaceable relative to the laser beam.

17. A nozzle according to claim 9, wherein the means for directing the laser beam includes means for displacing the laser beam relative to the inner passageway.

18. A nozzle according to claim 9, wherein the inner surface defines an elliptical inner passageway.

19. A method of processing a material using a nozzle having an inner passageway, the processing occurring along a predetermined direction, including the steps of:
    directing a gas flow through the inner passageway to create a center of gas pressure at a given point,
    directing a laser beam through the inner passageway to a focusing point displaced from given point forwardly in the direction of processing.

20. A method according to claim 19 further including a step of controlling the nozzle to maintain the focusing point in the forwardly direction of processing relative to said given point.

21. A method according to claim 20, wherein the step of controlling is accomplished by the step of:
    rotating the nozzle as the direction of processing changes to maintain said given point and focusing point aligned in the direction of processing.

22. A nozzle as in claim 5 wherein d is about 0.25 times D.

* * * * *

UNITED STATES PATENT AND TRADEMARK OFFICE
CERTIFICATE OF CORRECTION

PATENT NO. : 4,871,897

DATED : October 3, 1989

INVENTOR(S) : Steen E. NIELSEN

It is certified that error appears in the above-identified patent and that said Letters Patent is hereby corrected as shown below: Title Page

[73] Assignee: Instituttet for Produktudvikling, Lyngby, Denmark

Signed and Sealed this

Sixth Day of August, 1991

*Attest:*

HARRY F. MANBECK, JR.

*Attesting Officer*

*Commissioner of Patents and Trademarks*